March 12, 1968    D. C. ORCUTT ET AL    3,372,601

AUTOMATIC TRANSMISSION

Filed Sept. 29, 1965      5 Sheets-Sheet 1

FIG_1

INVENTORS
DALE C. ORCUTT
CLAUD J. DRY
BY

*Mellin, Moore & Weissenberger*
ATTORNEYS

March 12, 1968

D. C. ORCUTT ET AL

3,372,601

AUTOMATIC TRANSMISSION

Filed Sept. 29, 1965

INVENTORS
DALE C. ORCUTT
CLAUD J. DRY
BY

ATTORNEYS

FIG_13

FIG_14

United States Patent Office 3,372,601
Patented Mar. 12, 1968

3,372,601
AUTOMATIC TRANSMISSION
Dale C. Orcutt and Claud J. Dry, Athens, Ohio, assignors to Joart Capital Corporation, New York, N.Y., a corporation of New York
Filed Sept. 29, 1965, Ser. No. 491,296
14 Claims. (Cl. 74—336)

ABSTRACT OF THE DISCLOSURE

An automatic transmission having an input and an output shaft, a first centrifugally actuated clutch having its driving plate rotatable with the input shaft, a second centrifugally actuated clutch having its driving plate rotatable with the output shaft, rotatable means for preventing relative rotation of the driven clutch plates of the first and second centrifugally actuated clutches, an overriding clutch having a driven plate rotatable with the output shaft, and means for transmitting rotation of the rotatable means to the driving clutch plate of the overriding clutch and reducing the rate of the rotation.

---

This invention relates to an automatic transmission characterized by a series of centrifugally-actuated clutches mounted coaxially with an input and output shaft, and a secondary shaft for power transfer mounted generally parallel thereto. It may incorporate three or more forward speeds, neutral and reverse.

The present invention has a number of advantages over the automatic transmissions of the prior art, and accordingly has among its objects to provide an automatic transmission:

Low in cost and simple in design, allowing the majority of parts to be stamped;

Easily adjustable with respect to the threshold or engaging speed of the clutches;

Smooth in operation;

That requires no torque converter and attendant slippage;

Having no "creep" at idling speeds; and

Containing no planetary gear systems or oil pumps.

Each of the above objects is fulfilled by the specific embodiment which appears in the drawings, wherein:

FIG. 2 is a sectional view taken on the line 2—2 of FIG. 1 and shows the shifting mechanism and its relationship to the secondary shaft and forward drive sprocket.

FIG. 1 is a sectional view taken on the line 3—3 of FIG. 1 and shows a one-way or overriding clutch assembly.

FIG. 4 is a sectional view taken on the line 4—4 of FIG. 1 and shows a centrifugally-actuated clutch including the clutch weights.

FIG. 5 is a sectional view taken on the line 5—5 of FIG. 1 and shows a centrifugally-actuated clutch.

FIG. 7 is a sectional view taken on the line 7—7 of FIG. 1 and shows a spline-mounted sprocket and its relationship to the output shaft.

FIG. 8 is a sectional view taken on the line 8—8 of FIG. 1 and shows a spline-mounted sprocket and its relationship to both the input and output shafts. FIG. 8 represents a view of each side of the sprocket shown, since the sides are identical.

Figure 1:
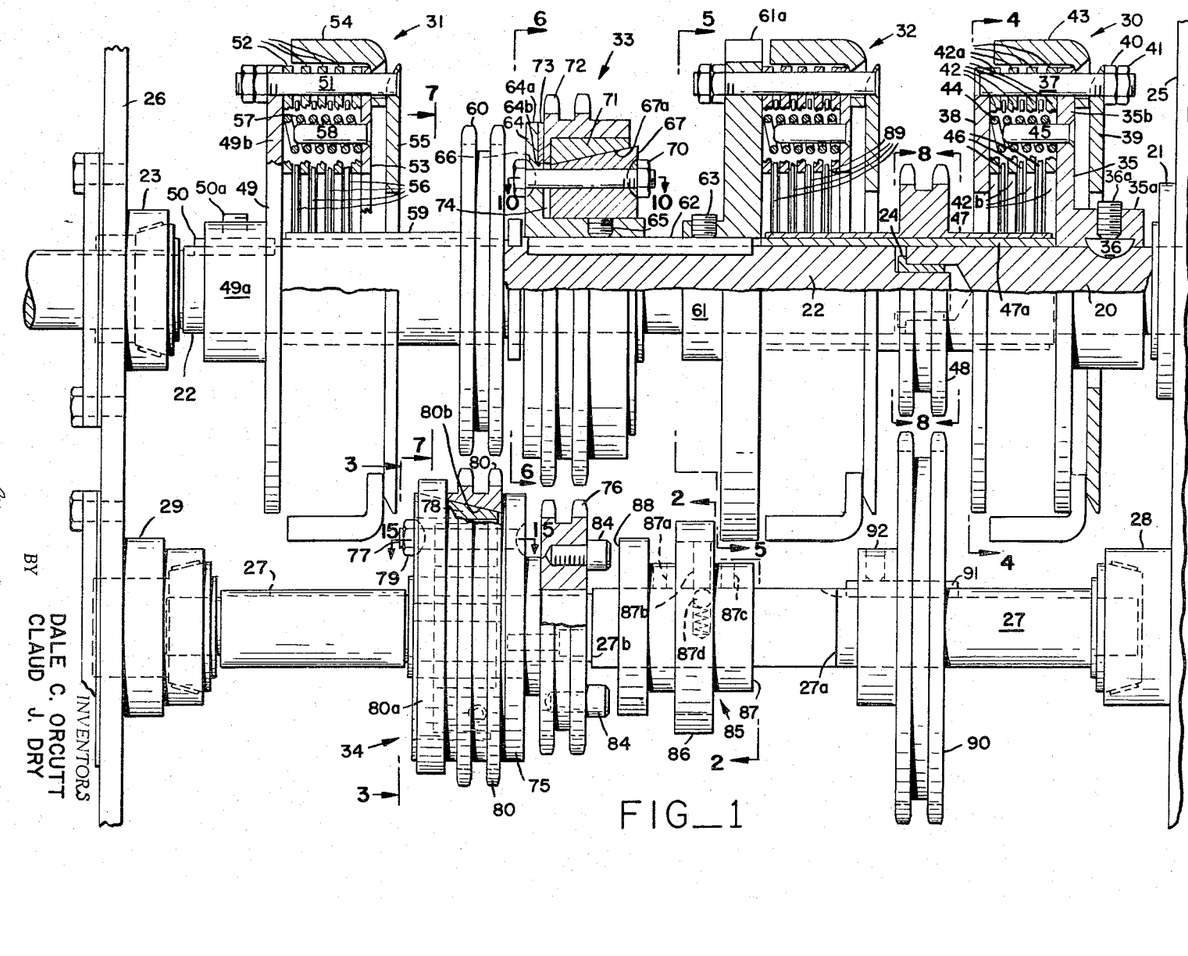
FIG. 1 is a partial vertical section showing the three centrifugally-actuated clutches and the general position of the input shaft, the output shaft, the clutch assemblies, and the secondary shaft mounted parallel to the input and output shafts. The transmission appears in neutral.

The present invention appears generally in FIG. 1. It includes an input shaft 20 rotatably mounted in bearing 21 for rotation (through a universal joint not shown) by the engine crankshaft (not shown). Input shaft 20 is coaxially engaged with output shaft 22, which is rotatably mounted in bearing 23 for engagement with an appropriate universal joint (not shown) connected to the vehicle drive shaft (not shown). The coaxial engagement includes pilot bearing 24 which engages the input shaft 20 and output shaft 22 to provide a fitting of close tolerance.

Bearings 21 and 23 are secured to plates 25 and 26 respectively, which also form the transmission housing.

A secondary shaft 27 is rotatably mounted in bearings 28 and 29 which are secured to mounting plates 25 and 26, respectively.

The automatic transmission includes three centrifugally-actuated clutch assemblies 30, 31 and 32. Clutch assembly 30 is rotated by input shaft 20 and is engaged in all three forward speeds. Clutch assembly 31 is provided for second gear and is engaged in both second and third gear but not engaged in first gear. Clutch assembly 32 is provided for third gear and is engaged only in third gear.

Figures 2, 3, 4, 5:
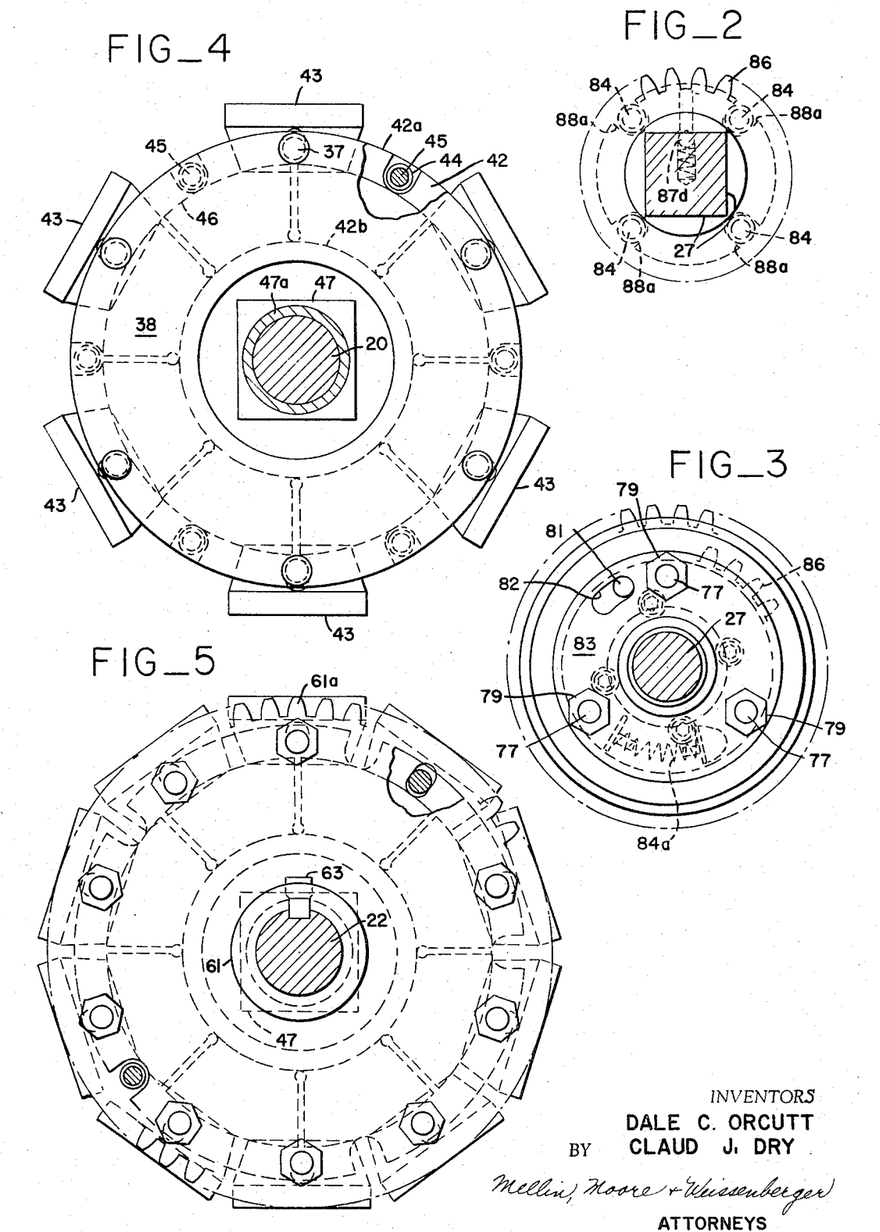

With reference to FIGS. 1 and 4, first gear clutch assembly 30 includes a hub 35, consisting of a collar portion 35a and an integrally connected plate portion 35b. Hub 35 is keyed to input shaft 20 by key 36, which is locked in place by set screw 36a threaded into collar 35a. As best seen in FIG. 4, bolts 37 are equally spaced about the periphery of plate 35b and extend slidably through plate 35b. Bolts 37 also extend through plates 38 and 39 which serve to confine and house the clutch. Adjusting nut 40 and locking nut 41 are threaded to bolt 37. Bolt 37 serves as a mounting for a series of driving clutch plates 42 and also serves as a mounting for clutch weights 43 which are positioned between hub plate 35b and plate 39. Driving clutch plates 42 extend from an outside diameter at 42a to an inside diameter at 42b.

Clutch disengagement springs 44 are seated on stud bolts 45 which are in turn mounted to hub plate 35b. Like bolts 37, stud bolts 45 are positioned on the periphery of hub plate 35b (see FIG. 4) beyond the outside diameter 42a of driven clutch plates 46.

Driven clutch plates 46 are positioned between driving clutch plates 42 and are mounted on square spline 47 of sprocket 48. Thus, driven clutch plates 46 rotate with sprocket 48. Spline 47 rotates on bronze bushing 47a.

Clutch disengagement springs 44 prevent engagement between the driving clutch plates 42 and driven clutch plates 46 of clutch assembly 30 unless compressed. Clutch disengagement springs 44 are compressed (and the driving and driven clutch plates engaged) when clutch weights 43 are centrifugally forced outwardly to thereby provide a lever action between hub plate 35b and plate 39 spreading them apart. The lever action compresses clutch disengagement spring 44 and brings the driving and driven clutch plates 42 and 46 respectively into engagement. When so engaged, rotation of input shaft 20 is therefore transmitted through clutch assembly 30 and sprocket 48 rotates.

Clutch assembly 31 is similar to clutch assembly 30. It includes a hub 49 divided into a collar portion 49a and a plate portion 49b. Collar 49a is keyed to output shaft 22 by key 50 and set screw 50a. Bolts 51 extend slidably through plate 49b and mount driving clutch plates 52, plate 53, clutch weights 54, and plate 55 to hub plate 49b. The clutch contains driven clutch plates 56, clutch disengagement springs 57 and spring mounting stud bolts 58. Driven clutch plates 56 are mounted to and rotate with spline 59 of sprocket 60. Clutch assembly 31 has a threshold r.p.m. less than the threshold r.p.m. of clutch assembly 30 since clutch assembly 31 is driven at output shaft speed when output shaft 22 is driven in low gear.

Clutch assembly 32 is similar to clutch assemblies 30 and 31, the only material difference being that hub 61, which is keyed to output shaft 22 by key 62 and set screw 63, includes gear teeth 61a on its periphery. In other respects it is the same as clutch assemblies 30 and 31, and has a threshold r.p.m. greater than the threshold r.p.m. of either clutch assembly 30 or clutch assembly 31.

The term "threshold r.p.m." refers to that r.p.m. at which clutch weights such as 43 and 54 are forced outwardly to thereby provide a lever action between plates such as 35b and 39 as well as plates 53 and 55. Thus the term refers to the r.p.m. at which the clutch becomes engaged. The threshold r.p.m. may be adjusted by means of adjusting nut 40. It may also be varied by changing the number of clutch weights per clutch, varying the mass of the clutch weights, and by varying the spring constant in springs 44. The threshold r.p.m. of the three clutch assemblies may vary considerably. However, in the case of clutch assemblies 31 and 32, both of which are mounted for rotation by output shaft 22, clutch assembly 31 must have a lower threshold r.p.m. than clutch assembly 32. Since clutch 30 is mounted on and actuated by input shaft 20, which may rotate independently of the rate of rotation of output shaft 22, its threshold r.p.m. need have no particular relation to the threshold r.p.m. of clutch assemblies 31 and 32.

Figure 6:
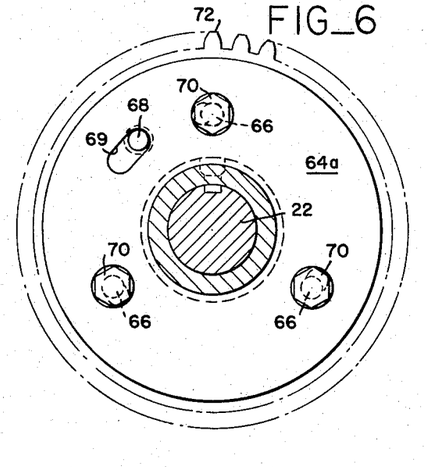
FIG. 6 is a sectional view taken on the line 6—6 of FIG. 1 and shows a second one-way or overriding clutch assembly.
Figures 7, 8:
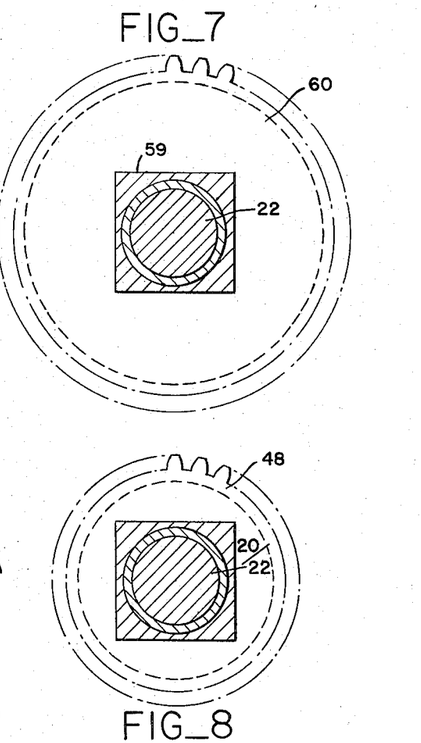
Figure 9:
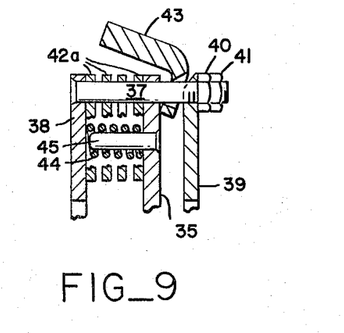
FIG. 9 is a partial sectional view showing a section of a clutch weight at an r.p.m. in excess of the threshold r.p.m. to thereby cause engagement of the clutch plates.

Two one-way overriding clutch assemblies 33 and 34 are provided. Overriding clutch assembly 33 includes hub 64 keyed to output shaft 22 by key 62 and set screw 65. Hub plate 64a of hub 64 defines a socket which accommodates the ball-end of bolt 66. Bolt 66 extends through hub plate 64a and loosely through cone 67, which has a conical clutching surface 67a. Cone 67 is free to rotate a limited amount about hub 64 in one direction only. As shown in FIG. 6, bolt 68 is threaded to cone 67 and extends through an elongated slot 69 in hub plate 64a. Thus, as viewed in FIG. 6, cone 67 is free to rotate in a counterclockwise direction with respect to hub plate 64a until bolt 68 completes its limited travel in slot 69.

Bolts 66 extend loosely through cone 67 and a ball-and-socket joint is provided between cone 67 and nut 70 to thereby allow the limited rotation of cone 67 with respect to hub plate 64a.

Cone 67 constitutes a driven clutch plate. The driving clutch plate in the clutch assembly 33 is the bearing material of trapezoidal cross section 71 upon which sprocket 72 is mounted. Thrust ring 73 is seated on a collar 64b of hub plate 64a for engagement with sprocket 72.

Figure 10A:
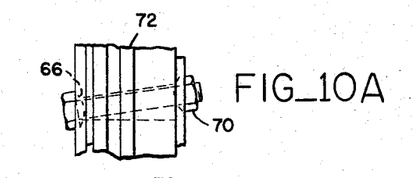
FIGS. 10A and 10B are partial sectional views taken on the line 10—10 of FIG. 1 and show the overriding clutch assembly during engagement (FIG. 10A) and when disengaged (FIG. 10B).
Figure 10B:
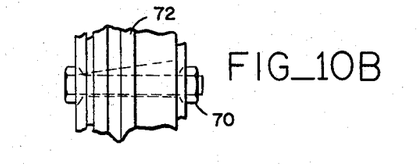

Overriding clutch assembly 33 is engaged when bolts 66 are positioned in cone 67 as shown in FIG. 10A. Such a position occurs when sprocket 72 is driven in a counterclockwise direction as viewed in FIG. 6. When, however, hub 64 is driven (by a means to be described below) at a faster rate (in a counterclockwise direction as viewed in FIG. 6) than the rate of sprocket 72, the clutch becomes disengaged with bolt 66 in the position shown in FIG. 10B, and bolt 68 at its limit of travel in slot 69. In the position shown in FIG. 10A, bolt 66 draws cone 67 toward hub plate 64a and wedges against driven clutch plate 71. Space 74 is provided between cone 67 and clutch plate 64a to allow the wedging action. When the clutch is engaged sprocket 72 becomes rotationally fixed to cone 67 and, as a result, hub 64 and output shaft 22.

Figure 15A:
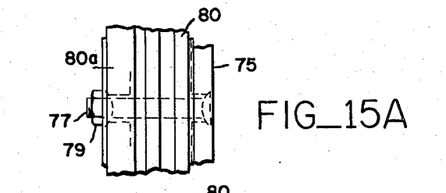
FIGS. 15A and 15B are partial sectional views taken on the line 15—15 of FIG. 1 and show the overriding clutch assembly during engagement (FIG. 15B) and when not engaged (FIG. 15A).
Figure 15B:
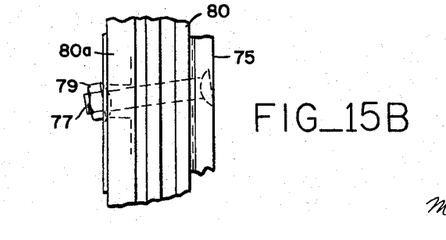

A similar overriding clutch assembly 34 is mounted to secondary shaft 27. It includes a hub plate 75 fixed to forward gear transfer sprocket 76 for rotation therewith on secondary shaft 27. Bolts 77 extend through hub plate 75 and form a ball-and-socket joint. Bolts 77 extend further through a conical driving clutch plate 78, which is similar to the conical clutch plate 67 of clutch assembly 33. Nut 79 forms a ball-and-socket joint between bolt 77 and conical clutch plate 78 and bolt 77 extends loosely through clutch plate 78. Sprocket 80 is formed integrally with collar 80a and has a conical inside diameter which comprises the driven clutch plate 80b. As best understood by viewing FIGS. 1 and 3, pin 81 is attached rigidly to hub plate 75, and extends loosely through conical clutch plate 78, and into slot 82 of backing plate 83. Thus, conical clutch plate 78 is free to rotate a limited distance in a clockwise direction (as viewed in FIG. 3) with respect to sprocket 76. Clutch assembly 34 is engaged when bolts 77 assume the position shown in FIG. 15B and is disengaged when bolts 77 assume the position shown in FIG. 15A.

In each of the overriding clutch assemblies 33 and 34, it is desirable to provide a spring 84a (see FIG. 3). Spring 84a is in tension and tends to rotate driven clutch plate with respect to the driving clutch plate to aid in beginning the toggle action of the bolts 66 and 77 which leads to clutch engagement.

Forward gear transfer sprocket 76 is provided with four pins 84 for engagement with accommodating notches in the shift mechanism 85 which appears in FIGS. 1 and 2.

Shift mechanism 85 is rotationally fixed but slidable on a square portion (see FIG. 2) of transfer shaft 27 which extends from 27a to 27b. It includes spur gear 86 integrally formed on collar 87. Shift mechanism 85 is slidable on secondary shaft 27 from a position in which notches 88a of face 88 are in engagement with pins 84 (forward gear) to a position when spur gear 86 is engaged with gear 61a (reverse gear). The intermediate position, shown in FIG. 1, is neutral gear. A spring loaded detent ball 87d is provided to releasably hold shift mechanism 85 in the three positions. Detent ball 87d co-operates with each of the three cylindrical cavities 87a, b and c for that purpose.

The clutch assemblies described above are linked together by means of double roller chain sprockets and roller chains. Clutch assemblies 30 and 32 are linked by means of sprocket 48 integrally formed on spline 47. Spline 47 extends in opposite directions from sprocket 48 (overlapping the joint between input shaft 20 and output shaft 22) and provides a mounting for the driven clutch plates 46 of clutch assembly 30 as well as the driven clutch plates 89 of clutch assembly 32. Sprocket 48 therefore constitutes a rotatable means for preventing relative rotation of driven clutch plates 46 and 89. Thus driven clutch plates 46 and 89 rotate with sprocket 48, and vice versa.

Sprocket 90 is keyed to secondary or transfer shaft 27 by means of key 91 and set screw 92 to provide a link between sprocket 48 and transfer shaft 27. Thus rotation of sprocket 48 causes a rotation of shaft 27.

Sprockets 72, 80, and 76 have been previously described in connection with overriding clutch assemblies 33 and 34.

Sprocket 60, integrally formed on spline 59, links the driven clutch plates 56 of clutch assembly 31 with sprocket 80. Driven clutch plates 56 are mounted on spline 59 and are rotatable therewith.

Sprockets 48, 60, 72, 76, 80, and 90 and spur gears 61a and 86 are provided with the relative diameters shown in FIG. 1 to provide the proper gear reduction. In particular, the following sizes of the sprockets and gears have been found to be suitable.

| Sprocket (reference numeral): | Teeth (total number) |
|---|---|
| 48 | 25 |
| 60 | 34 |
| 72 | 40 |
| 76 | 25 |
| 80 | 32 |
| 90 | 40 |

| Gear (reference numeral): | Teeth—pitch |
|---|---|
| 61a | 61–10 |
| 86 | 25–10 |

Although not shown, sprockets 48 and 90, 76 and 72, and 80 and 60 are linked by means of double roller chains.

OPERATION

Neutral

With the shift mechanism 85 in the position shown in FIG. 1, neither pins 84 of sprocket 76 nor reverse spur gear 61a are engaged. There is, therefore, no link between the input shaft 20 and the output shaft 22, and accordingly the transmission is in neutral.

First gear

Figure 11:
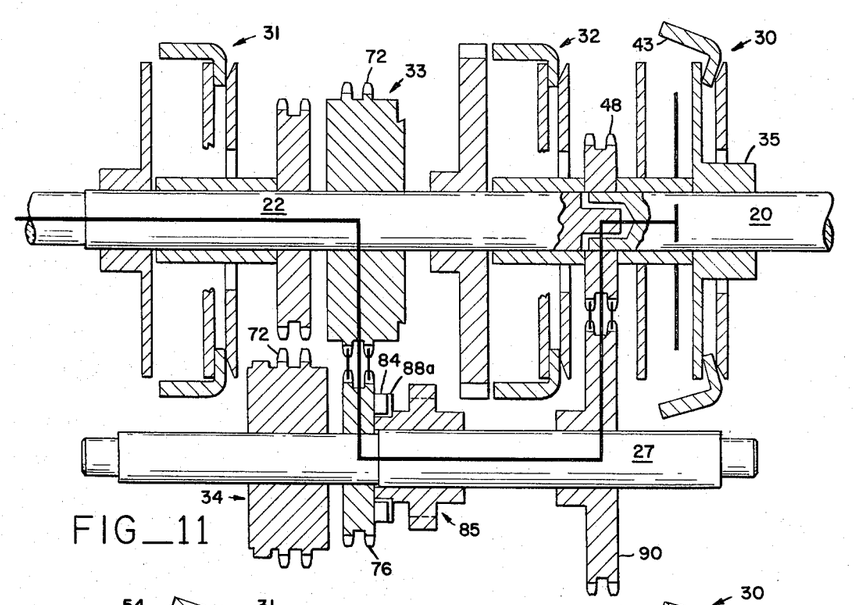
FIG. 11 is a schematic sectional view of the automatic transmission. It shows the power train and the position of the clutch weights on each of the three centrifugally-actuated clutches when the transmission is operating in first gear.

First gear appears schematically in FIG. 11. Shift mechanism 85 is positioned with notches 88a engaged with pins 84 of forward gear transfer sprocket 76. Upon acceleration of the engine and, as a result, input shaft 20, hub 35 of clutch assembly 30 is caused to accelerate. When clutch 30 reaches its threshold r.p.m., clutch weights 43 are urged outwardly and cause driving clutch plates 42 (which are rotating with input shaft 20) to engage driven clutch plates 46 to cause rotation thereof. Driven clutch plates 46 therefore rotate with driving clutch plates 42.

Driven clutch plates 46 rotate spline 47, and sprocket 48 is therefore caused to rotate. The rotation is transferred to sprocket 90, secondary shaft 27, shift mechanism 85, forward gear transfer sprocket 76 and sprocket 72. Both overriding clutch assembly 33 and overriding clutch assembly 34 are engaged. Sprocket 72 therefore causes hub 64 to rotate and consequently output shaft 22 is rotated. Sprocket 60 is rotated by sprocket 80 and consequently driving clutch plates 56 are rotated, but clutch assembly 31 is disengaged and, accordingly, sprocket 60, spline 59 and driving clutch plates 56 rotate freely about output shaft 22.

Thus, with reference to FIG. 11, the power train in low gear includes input shaft 20, centrifugally-actuated clutch 30, sprocket 48, sprocket 90, transfer shaft 27, shift mechanism 85, sprocket 76, sprocket 72, overriding clutch 33, and finally output shaft 22. The gear reduction is determined by the relative diameters of sprockets 48 and 90, and 76 and 72. Clutch assemblies 31 and 32 are each disengaged.

Second gear

Figure 12:
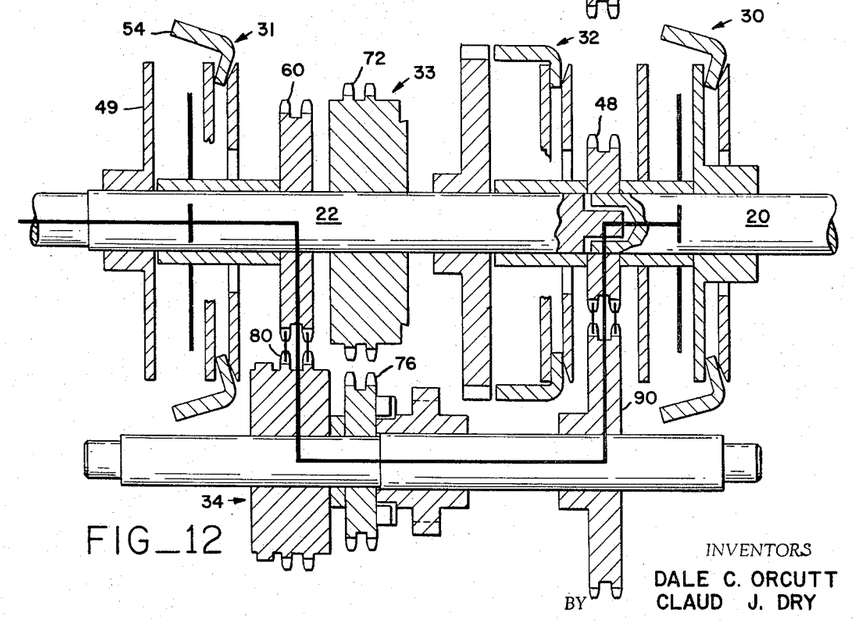
FIG. 12 is a view similar to the view of FIG. 11 and shows the power train when the automatic transmission is operating in second gear.

As the engine accelerates in low gear, output shaft 22 also accelerates. Since hub 49 of clutch assembly 31 is keyed to output shaft 22, it also rotates. When it reaches its threshold r.p.m., clutch weights 54 having been forced outwardly by centrifugal force, driving clutch plates 52 are in engagement with driven clutch plates 56 and cause the latter to rotate.

With clutch assembly 31 engaged, the power train (shown schematically in FIG. 12) shifts to include overriding or one-way clutch 34 and bypass overriding clutch 33 as follows.

Sprocket 76 causes both sprocket 72 and conical driving clutch plate 78 to rotate. With drag imposed upon sprocket 60, because it is rotationally fixed to output shaft 22 (by engagement with clutch 31), overriding clutch assembly 34 engages. Accordingly, power is transferred from conical driving clutch plate 78 to sprocket 80 and then to sprocket 60. The gear ratio of sprockets 80 and 60 is less than the ratio between sprockets 76 and 72. Output shaft 22 is therefore rotated faster by sprocket 60 (through clutch 31) then by hub 64 (through overriding clutch 33). Overriding clutch 33 is therefore overridden and disengages. Sprocket 72 turns freely with respect to hub 64 and the load is assumed by clutch 34.

With the shift from first gear to second gear completed, the driving members of clutch assembly 31 have become driven members and the driven members (in low gear) have become driving members. In particular, hub 49 and clutch plates 52 are driving members with respect to actuating clutch 31. Clutch plates 56 and sprocket 60 are driven. Since clutch 34 is already engaged and driving sprocket 60, after clutch assembly 31 is engaged sprocket 60 assumes the load and becomes a driving member, along with clutch plates 56. To complete the picture, clutch plates 52 and hub 49 are driven and, in turn, drive output shaft 22.

In the claims, the terms "driven" and "driving" are used and refer to the functions of the elements in engaging the clutches.

Thus, with reference to FIG. 12, the power train in second gear includes input shaft 20, clutch 30, sprocket 48, sprocket 90, secondary shaft 27, shift mechanism 85, sprocket 76, clutch 34, sprocket 80, sprocket 60, clutch 31, and finally output shaft 22. Clutch 32 and overriding clutch 33 are disengaged. The gear reduction is determined by the relative diameters of sprockets 48 and 90 and sprockets 80 and 60.

Third gear

Figure 13:
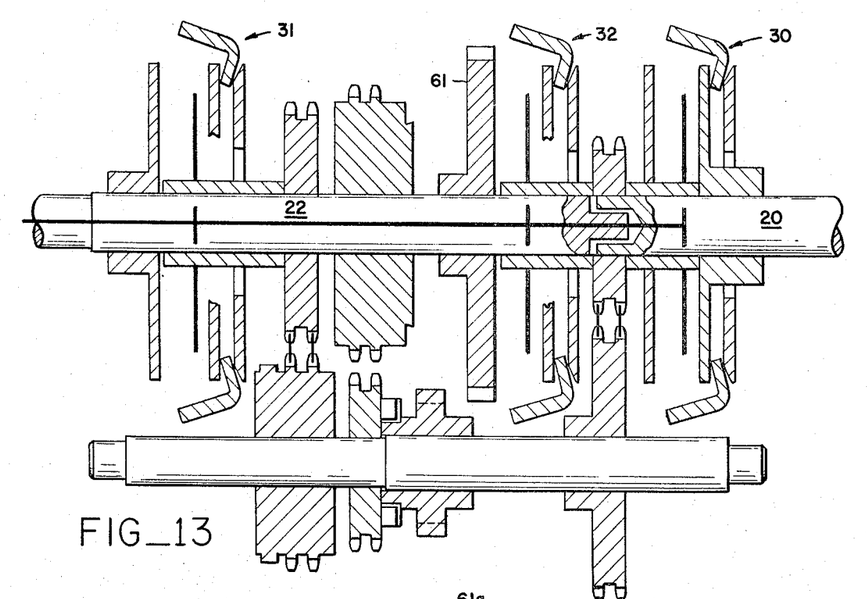
FIG. 13 is a view similar to the view of FIG. 11 and shows the power train when the automatic transmission is operating in third gear.

As output shaft 22 accelerates, due to engine acceleration in second gear, hub 61 of clutch assembly 32 also accelerates. When clutch assembly 32 reaches its threshold r.p.m. (in excess of the threshold r.p.m. of clutch 31), it engages and links output shaft 22 directly with input shaft 20. The direct link is through the driven clutch plates 89 and 46 of clutches 32 and 30 respectively, and spline 47. Thus, there is no gear reduction from input shaft 20 to output shaft 22. Accordingly, output shaft 22 is rotated at an increased speed, and one-way clutch assembly 34 is overriden through sprocket 90 and sprocket 76.

As in the case of clutch assembly 31 in second gear, the driving and driven members of clutch assembly 32 exchange roles as clutch assembly 32 engages.

Thus, with reference to Fig. 13, the power train in third gear includes input shaft 20, clutch 30, spline 47, clutch 32, and output shaft 22. Each of the centrifugally-actuated clutches 30, 31 and 32 is engaged. Each of the overriding clutches 33 and 34 is disengaged.

Reverse

Figure 14:
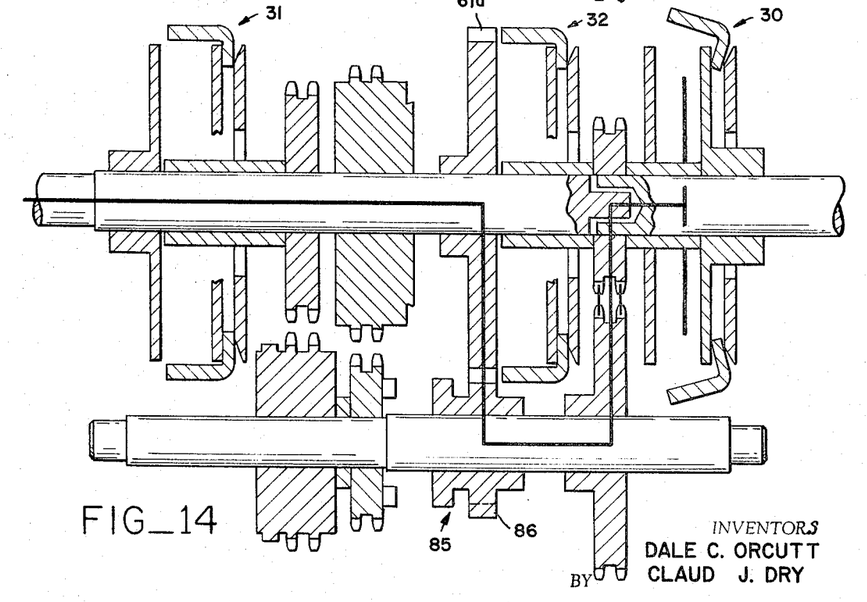
FIG. 14 is a view similar to the view of FIG. 11 and shows the power train when the automatic transmission is operating in reverse.

Reverse gear is shown in Fig. 14. Shift mechanism 85 is positioned with spur gear 86 in engagement with spur gear 61a on the periphery of hub plate 61. Forward gear transfer sprocket 76 is disengaged from face 88 of shift mechanism 85. When clutch 30 engages, hub plate 61, keyed to output shaft 22, causes it to rotate.

Since the connection between secondary shaft 27 and output shaft 22 in the case of forward gears is either a sprocket-and-chain connection (first and second gears) or a direct link (third gear), both shafts rotate in the same direction. In the case of reverse, however, the connection consists of gears 86 and 61a. Output shaft 22 is, therefore, caused to rotate in a direction opposite to the direction of rotation imparted thereto in forward gears.

Thus the power train includes input shaft 20, clutch 30, sprocket 48, sprocket 90, secondary shaft 27, spur gear 86, spur gear 61a, hub plate 61, and finally output shaft 22. Only clutch 30 is engaged. The gear reduction is determined by the relative diameters of sprockets 48 and 90, and gears 86 and 61a.

It will be readily recognized that gears could be used exclusively in place of the sprocket-and-chain linkage shown. In addition, for some applications both the shifting means and third gear might be eliminated. In the event that it is desired to provide an automatic transmission with two forward speeds only (without shifting means or reverse), shift mechanism 85, overriding clutch 34, centrifugally-actuated clutch 31, and sprocket 60 could be eliminated. The two forward speeds would then be provided for by centrifugally-actuated clutches 30 and 32, overriding clutch 33, and the reducing means consisting of sprockets 48, 90, 76, and 72.

Additional speeds may be added by adding a centrifugally-actuated clutch assembly and one overriding clutch assembly for each additional speed desired. The additional clutches should form an additional assembly like the assembly that includes clutch 31, sprocket 60, and clutch 34 and be placed to the left of the elements shown in FIG. 1 on output shaft 22 and secondary shaft 27. The additional centrifugally-actuated clutch should have a threshold r.p.m. less than the threshold r.p.m. of clutch 31. The present invention, accordingly, contemplates the presence of additional forward speeds where the additional speed is merely provided by elements added to the structure shown in FIG. 1.

Having thus described our invention, we claim:

1. An automatic transmission which comprises:
   (a) an input shaft rotatably mounted;
   (b) an output shaft rotatably mounted coaxially with said input shaft;
   (c) a first centifugally-actuated clutch having a driving clutch plate rotatable with said input shaft, a driven clutch plate, and centrifugally-actuated means rotatable with said input shaft for causing engagement of said driving and said driven clutch plates to thereby prevent relative rotation thereof;
   (d) a second centrifugally-actuated clutch having a driving clutch plate rotatable with said output shaft, a driven clutch plate, and centrifugally-actuated means rotatable with said output shaft for causing engagement of said driving and said driven clutch plates of said second centrifugally-actuated clutch at a threshold r.p.m. to thereby prevent relative rotation thereof;
   (e) rotatable means for preventing relative rotation of said driven clutch plates of said first and said second centrifugally-actuated clutches;
   (f) an overriding clutch having a driven clutch plate rotatable with said output shaft, a driving clutch plate, and means for causing engagement of said driving and said driven clutch plates of said overriding clutch; and
   (g) reducing means for transmitting rotation of said rotatable means to said driving clutch plate of said overriding clutch and reducing the rate of said rotation.

2. The automatic transmission of claim 1 and shifting means for selectively engaging and disengaging said rotatable means with said driving clutch plate of said overriding clutch.

3. The automatic transmission of claim 2 and means rotatable by said input shaft and engageable with said output shaft when said shifting means is positioned to disengage said rotatable means from said driving clutch plate of said overriding clutch, for rotating said shaft in a direction opposite to the direction of rotation imparted thereto by said overriding clutch.

4. An automatic transmission which comprises:
   (a) an input shaft rotatably mounted;
   (b) an output shaft rotatably mounted coaxially with said input shaft;
   (c) a first centifugally-actuated clutch having a driving clutch plate rotatable with said input shaft, a driven clutch plate, and centrifugally-actuated means rotatable with said input shaft for causing engagement of said driving and said driven clutch plates at a threshold r.p.m. to thereby prevent relative rotation thereof;
   (d) a second centrifugally-actuated clutch having a driving clutch plate rotatable with said output shaft, a driven clutch plate, and centrifugally-actuated means rotatable with said output shaft for causing engagement of said driving and said driven clutch plates of said second centrifugally-actuated clutch at a threshold r.p.m. to thereby prevent relative rotation thereof;
   (e) rotatable means for preventing relative rotation of said driven clutch plates of said first and said second centrifugally-actuated clutches;
   (f) a third centrifugally-actuated clutch having a driving clutch plate rotatable with said output shaft, a driven clutch plate, and centrifugally-actuated means rotatable with said output shaft for causing engagement of said driving and said driven clutch plates of said third centrifugally-actuated clutch at a threshold r.p.m. less than the threshold r.p.m. of said second centrifugally-actuated clutch;
   (g) a first overriding clutch having a driven clutch plate rotatable with said output shaft, a driving clutch plate, and means for causing engagement of said driving and said driven clutch plates of said overriding clutch;
   (h) a second overriding clutch having a driving clutch plate, a driven clutch plate and means for engaging said driving and said driven clutch plates of said second oevrriding clutch;
   (i) a first reducing means for transmitting rotation of said rotatable means to said driving clutch plate of said first and second overriding clutches and reducing the rate of said rotation; and
   (j) a second reducing means for transmitting rotation of said driven clutch plate of said second overriding clutch to said driven clutch plate of said third centrifugally-actuated clutch and reducing the rate of said rotation, said first reducing means imparting a greater reduction in said rate of rotation than said second reducing means.

5. The automatic transmission of claim 4 and shifting means for selective engaging and disengaging said rotatable means with said driven clutch plate of said first and said second overriding clutch.

6. The automatic transmission of claim 5 and means rotatable by said input shaft and engageable with said output shaft when said shifting means is positioned to disengage said rotatable means from said driving clutch plate of said first and said second overriding clutch, for rotating said shaft in a direction opposite to the direction of rotation imparted thereto by said overriding clutches.

7. An automatic transmission which comprises:
   (a) an input shaft rotatably mounted;
   (b) an output shaft independently rotatably mounted coaxially with said input shaft to thereby form a joint;
   (c) a secondary shaft rotatable mounted parallel with said input and said output shafts and spaced therefrom;
   (d) a first centrifugally-actuated clutch having a driving clutch plate rotatable with said input shaft, a driven clutch plate, and centrifugally-actuated means rotatable with said input shaft for causing engagement of said driving and said driven clutch plates at a threshold r.p.m. to thereby prevent relative rotation thereof;

(e) a second centrifugally-actuated clutch having a driving clutch plate rotatable with said output shaft, a driven clutch plate, and centrifugally-actuated means rotatable with said output shaft for causing engagement of said driving and said driven clutch plates of said second centrifugally-actuated clutch at a threshold r.p.m. to thereby prevent relative rotation thereof;

(f) rotatable means mounted coaxially with said input and said output shafts and extending from one side of said joint to the other, for preventing relative rotation of said driven clutch plates of said first and said second centrifugally-actuated clutches; and (g) an overriding clutch having a driven clutch plate rotatable with said output shaft, a driving clutch plate, and means for causing engagement of said driving and said driven clutch plates of said overriding clutch.

8. The automatic transmission of claim 7 and shifting means mounted coaxially with said secondary shaft, rotatable therewith, and slidable thereon, for engaging and disengaging said rotatable means with said driving clutch plate of said overriding clutch.

9. The automatic transmission of claim 8 and means rotatable with said shifting means and engageable with said output shaft when said shifting means is positioned to disengage said rotatable means from said driving clutch plate of said overriding clutch, for rotating said shaft in a direction opposite to the direction of rotation imparted thereto by said overriding clutch.

10. An automatic transmission which comprises:
(a) an input shaft rotatably mounted;
(b) an output shaft independently rotatably mounted coaxially with said input shaft to thereby form a joint;
(c) a secondary shaft rotatably mounted parallel with said input and said output shafts and spaced therefrom;
(d) a first centrifugally-actuated clutch having a driving clutch plate rotatable with said input shaft, a driven clutch plate, and centrifugally-actuated means rotatable with said input shaft for causing engagement of said driving and said driven clutch plates at a threshold r.p.m. to thereby prevent relative rotation thereof;
(e) a second centrifugally-actuated clutch having a driving clutch plate rotatable with said output shaft, a driven clutch plate, and centrifugally-actuated means rotatable with said output shaft for causing engagement of said driving and said driven clutch plates of said second centrifugally-actuated clutch at a threshold r.p.m. to thereby prevent relative rotation thereof;
(f) rotatable means mounted coaxially with said input and said output shafts and extending from one side of said joint to the other, for preventing relative rotation of said driven clutch plates of said first and said second centrifugally-actuated clutches;
(g) a third centrifugally-actuated clutch having a driving clutch plate rotatable with said output shaft, a driven clutch plate, and centrifugally-actuated means rotatable with said output shaft for causing engagement of said driving and said driven clutch plates of said third centrifugally-actuated clutch at a threshold r.p.m. less than the threshold r.p.m. of said second centrifugally-actuated clutch;
(h) a first overriding clutch having a driven clutch plate rotatable with said output shaft, a driving clutch plate, and means for causing engagement of said driving and said driven clutch plates of said overriding clutch;
(i) a second overriding clutch having a driving clutch plate, a driven clutch plate and means for engaging said driving and said driven clutch plates of said second overriding clutch;
(j) a first reducing means for transmitting rotation of said rotatable means to said driving clutch plate of said first and said second overriding clutches and reducing the rate of said rotation; and
(k) a second reducing means for transmitting rotation of said driven clutch plate of said second overriding clutch to said driven clutch plate of said third centrifugally-actuated clutch and reducing the rate of said rotation, said first reducing means imparting a greater reduction in said rate of rotation than said second reducing means.

11. The automatic transmission of claim 10 and shifting means mounted coaxially with said secondary shaft, rotatable therewith, and slidable thereon, for engaging and disengaging said rotatable means with said driving clutch plate of said overriding clutch.

12. The automatic transmission of claim 11 and means rotatable with said shifting means and engageable with said output shaft when said shifting means is positioned to disengage said rotatable means from said driving clutch plate of said overriding clutch, for rotating said shaft in a direction opposite to the direction of rotation imparted thereto by said overriding clutch.

13. An automatic transmission which comprises:
(a) an input shaft rotatably mounted;
(b) an output shaft independently rotatably mounted coaxially with said input shaft to thereby form a joint;
(c) a secondary shaft rotatably mounted parallel with said input and said output shafts and spaced therefrom;
(d) a first centrifugally-actuated clutch mounted coaxially about said input shaft and having a driving clutch plate rotatable with said input shaft, a driven clutch plate, and centrifugally-actuated means rotatable with said input shaft for causing engagement of said driving and said driven clutch plates at a threshold r.p.m. to thereby prevent relative rotation thereof;
(e) a second centrifugally-actuated clutch mounted coaxially about said output shaft and having a driving clutch plate rotatable with said output shaft, a driven clutch plate, and centrifugally-actuated means rotatable with said output shaft for causing engagement of said driving and said driven clutch plates of said second centrifugally-actuated clutch at a threshold r.p.m. to thereby prevent relative rotation thereof;
(f) rotatable means mounted coaxially with said input and said output shafts and extending from one side of said joint to the other, for preventing relative rotation of said driven clutch plates of said first and said second centrifugally-actuated clutches;
(g) a third centrifugally-actuated clutch mounted coaxially about said output shaft and having a driving clutch plate rotatable with said output shaft, a driven clutch plate, and centrifugally-actuated means rotatable with said output shaft for causing engagement of said driving and said driven clutch plates of said third centrifugally-actuated clutch at a threshold r.p.m. less than the threshold r.p.m. of said second centrifugally-actuated clutch;
(h) a first overriding clutch mounted coaxially about said output shaft and having a driven clutch plate rotatable with said output shaft, a driving clutch plate, and means for causing engagement of said driving and said driven clutch plates of said overriding clutch;
(i) a second overriding clutch mounted coaxially about said secondary shaft and having a driving clutch plate, a driven clutch plate, and means for engaging said driving and said driven clutch plates of said second overriding clutch;

(j) a first reducing means for transmitting rotation of said rotatable means to said secondary shaft and reducing the rate of said rotation;

(k) forward gear transfer means mounted coaxially about said secondary shaft and rotatable thereon, said transfer means being rotationally fixed to said driving clutch plate of said second overriding clutch;

(l) shifting means mounted coaxially about said secondary shaft, rotatable therewith, and slidable thereon, for engaging and disengaging said forward gear transfer means;

(m) a second reducing means for transmitting rotation of said forward gear transfer means to said driving clutch plate of said first overriding clutch and reducing the rate of said rotation;

(n) a third reducing means for transmititng rotation of said driven clutch plate of said second overriding clutch to said driven clutch plates of said third centrifugally-actuated clutch and reducing the rate of rotation thereof, said second reducing means imparting a greater reduction in said rate of rotation than said third reducing means; and (o) reverse means rotatable with said shifting means and engageable with said second centrifugally-actuated clutch when said shifting means is disengaged from said forward gear transfer means, for rotating said clutch and said output shaft in a direction opposite to the direction of rotation imparted thereto by said forward gear transfer means.

14. The automatic transmission of claim 13 and detent means for releasably securing said shifting means in selective engagement with said forward gear transfer means, said second centrifugally-actuated clutch, and simultaneously out of engagement with said forward gear transfer means and said second centrifugally-actuated clutch.

References Cited
UNITED STATES PATENTS 1,734,491   11/1929   Keller _______________ 74—336

DONLEY J. STOCKING, *Primary Examiner.*

H. S. LAYTON, *Assistant Examiner.*